US009418546B1

(12) United States Patent
Whiting et al.

(10) Patent No.: US 9,418,546 B1
(45) Date of Patent: Aug. 16, 2016

(54) TRAFFIC DETECTION WITH MULTIPLE OUTPUTS DEPENDING ON TYPE OF OBJECT DETECTED

(71) Applicant: ITERIS, INC., Santa Ana, CA (US)

(72) Inventors: Michael T. Whiting, Rancho Santa Margarita, CA (US); Yan Gao, Placentia, CA (US); Dilip Swaminathan, Costa Mesa, CA (US); Shashank Jayaram Shivakumar, Santa Ana, CA (US); Robert J. Hwang, Brea, CA (US); Robert Ung, San Bernardino, CA (US)

(73) Assignee: ITERIS, INC., Santa Ana, CA (US)

( * ) Notice: Subject to any disclaimer, the term of this patent is extended or adjusted under 35 U.S.C. 154(b) by 0 days.

(21) Appl. No.: 14/942,796

(22) Filed: Nov. 16, 2015

(51) Int. Cl.
| | |
|---|---|
| *G08G 1/07* | (2006.01) |
| *G08G 1/017* | (2006.01) |
| *G06K 9/00* | (2006.01) |

(52) U.S. Cl.
CPC .............. *G08G 1/07* (2013.01); *G06K 9/00771* (2013.01); *G08G 1/0175* (2013.01)

(58) Field of Classification Search
CPC ............ G06T 2207/10016; G06T 7/20; G06T 7/2006; G06T 2207/30232; G06K 9/00785
USPC ........................................................ 382/104
See application file for complete search history.

(56) References Cited

U.S. PATENT DOCUMENTS

| | | | |
|---|---|---|---|
| 2008/0129546 A1* | 6/2008 | Manor ................ | G01S 13/4445 340/936 |
| 2010/0150403 A1* | 6/2010 | Cavallaro ........... | G06K 9/00778 382/107 |
| 2011/0095908 A1* | 4/2011 | Nadeem .................... | B60H 3/00 340/905 |
| 2011/0228987 A1* | 9/2011 | Iwasaki ................. | G06T 7/2006 382/107 |
| 2012/0139753 A1* | 6/2012 | Finlay .................... | G08G 1/015 340/905 |
| 2013/0128050 A1* | 5/2013 | Aghdasi ................. | H04N 7/181 348/158 |
| 2014/0358413 A1* | 12/2014 | Trombley ................ | G06G 1/00 701/118 |
| 2015/0310365 A1* | 10/2015 | Li ...................... | G06Q 10/0639 705/7.38 |

* cited by examiner

*Primary Examiner* — Stephen R Koziol
*Assistant Examiner* — Shaghayegh Azima
(74) *Attorney, Agent, or Firm* — Lazaris IP (57) ABSTRACT

A multi-object zonal traffic detection framework analyzes temporal and spatial information from one or more sensors in a classification engine that identifies and differentiates objects within a single identified traffic detection zone. The classification engine applies a whole scene analysis and an adaptive background zone detection model to classify cars, trucks, bicycles, pedestrians, incidents, and other objects within the single identified traffic detection zone and generates counts for each object type for traffic system management.

30 Claims, 5 Drawing Sheets

TRAFFIC DETECTION WITH MULTIPLE OUTPUTS DEPENDING ON TYPE OF OBJECT DETECTED

FIELD OF THE INVENTION

The present invention relates to identification of objects in the field of traffic detection. Specifically, the present invention relates to a system and method of classifying multiple objects within a single traffic detection zone and generating different outputs for a traffic signal controller.

BACKGROUND OF THE INVENTION

There are many conventional traffic detection systems. Conventional systems typically utilize sensors, either in the roadway itself, or positioned at a roadside location or on traffic lights proximate to the roadway. The most common type of vehicular sensors are inductive coils, or loops, embedded in a road surface. Other existing systems utilize video cameras, radar sensors, acoustic sensors, or magnetometers, either in the road itself, or at either the side of a roadway or positioned higher above traffic to observe and detect vehicles in a desired area. Each of these sensors provide information used to determine a presence of vehicles in specific lanes in intersections, to provide information to traffic signals for proper actuation.

These conventional detection systems are commonly set up with 'virtual zones', which are hand- or machine-drawn areas on an image where objects may be moving or present. Traditionally, a vehicle passes through or stops in a zone, and these zones generate an "output" when an object is detected as passing through or resting within all or part of the zone.

Many detection systems are capable of detecting different types of vehicles, such as cars, trucks, bicycles, motorcycles, pedestrians, etc. This is accomplished by creating special zones within a field of view to differentiate objects, such as bicycle zones and pedestrian zones. Therefore, conventional detection systems are capable of differentiating, for example, bicycles from other types of vehicles by analyzing these special zones. However, one limitation of this approach is that multiple zones have to be drawn, often over the top of each other at the same location, to be able to provide outputs for different modes. Therefore there is a need in the art for a system and method which is capable of differentiating between objects in only one zone within an area of traffic detection.

Outputs are sent to a traffic signal controller, which performs control and timing functions based on the information provided. These outputs also provide traffic planners and engineers with information on the volume of traffic at key points in a traffic network. This information is important for comparing volumes over periods of time to help with accurate adjustment of signal timing and managing traffic flow. Current systems and methods of traffic detection provide data that results only from a count of a total number of vehicles, which may or may not include bicycles or other road users, as therefore there is no way differentiating between different types of vehicles. As the need for modified signal timing to accommodate bicyclists, pedestrians and others becomes more critical for proper traffic management, a method for separating the count of all modes of use on a thoroughfare is needed to improve the ability to accurately manage traffic environments.

BRIEF SUMMARY OF THE INVENTION

It is therefore one objective of the present invention to provide a system and method of identifying multiple objects in a single traffic detection zone. It is another objective of the present invention to provide a system and method of accurately classifying objects within an identified traffic detection using data from different types of sensors. It is still another objective to provide separate counts for different types of objects within a traffic detection zone to traffic signal controllers.

The present invention provides systems and methods of identifying an area of interest in a field of view, otherwise referred to as a traffic detection zone, and generating multiple outputs based on the type of object detected within that traffic detection zone. These systems and methods present a multi-object zonal traffic detection framework that is initialized by identifying an area of interest and drawing a single traffic detection zone for that area of interest in the field of view. The traffic detection zone is configured to provide separate outputs and counts that depend on the type of object detected. Several possible outputs are initialized, for example:

Output A for Commercial Vehicles, Large Trucks
Output B for Commercial Vehicles, Cars, Light Trucks
Output C for Bicycles, Motorcycles
Output D for Pedestrians
Output E for Incidents It should be noted that many other outputs are possible, and the present invention can be initialized with any number outputs and object types, and therefore is not to be limited to any specific number.

In addition, the traffic detection zone is configured to produce a count of each type of object detected. Using the geometry of the zone drawn, a lane structure of a particular traffic approach can be estimated and individual zone counts can be aggregated into lane-wise counts of different object types. This output is stored locally for later retrieval or transmission to a central system for analysis and presentation.

The multi-object zonal traffic detection framework includes a classification engine that constantly learns as more information is collected and ingested from the sensor systems. The engine classifies different objects into cars, trucks, bicycles, pedestrian, incidents, and others based on the unique features of each class, and continuously and adaptively updates its knowledge of unique features of each class as more objects are processed.

Other objects, embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

Figure 1:
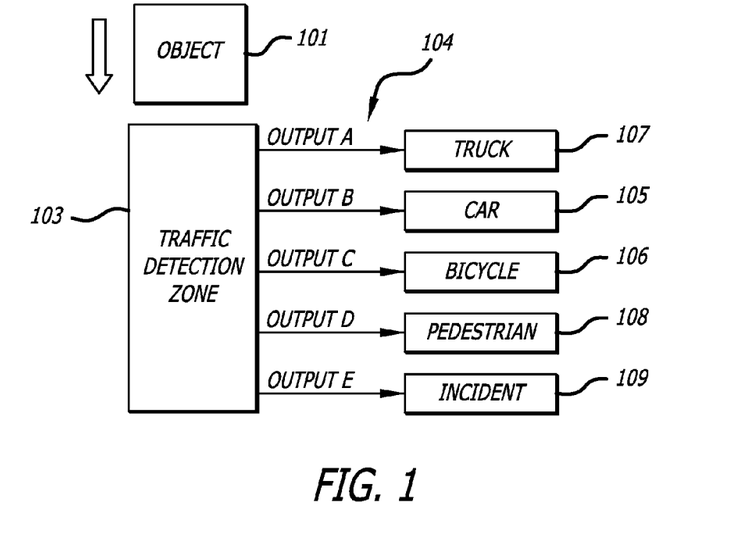
FIG. 1 is a block diagram illustrating an object entering a traffic detection zone and various outputs following classification according to the multi-object zonal traffic framework of the present invention.
Figure 2:
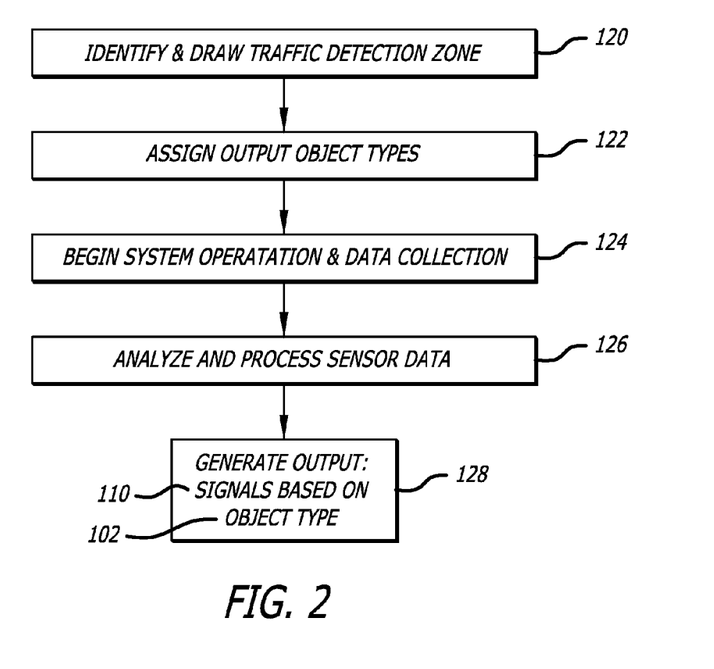
FIG. 2 is a flowchart of steps in a multi-object zonal traffic detection framework according to one aspect of the present invention.

FIG. 1 and FIG. 2 are a block diagram and a flowchart, respectively, outlining basic elements of the multi-object zonal traffic detection framework 100. FIG. 1 shows an object 101 entering an identified traffic detection zone 103. The framework 100 is configured to analyze the zone 103, classify the object 101 according to an object type 102, and generate an output 104. A different output 104 is generated for each object 101 that is classified as a type 102—for example, different outputs 104 for a car 105, a bicycle 106, a truck or other commercial vehicle 107, a pedestrian 108, or an incident 109.

It should be noted that many additional object types 102 are possible and may be configured within the framework 100, and therefore are within the scope of the present invention. For example, additional outputs 104 may be configured for disabled persons using wheelchairs or motorized forms of transportation similar to wheelchairs, disabled persons using the aid of guide animals, and for elderly pedestrians moving slower and/or with walking aids. Accordingly the present invention is not intended to be limited by any listing of outputs herein.

FIG. 2 is a flowchart of steps in a process of performing a multi-object zonal traffic detection framework 100 for evaluating one or more objects 101 within the identified traffic detection zone 103, and generating outputs 104, according to one embodiment of the present invention. The framework 100, as noted above, includes a classification engine performed within one or more systems and/or methods that includes several components, each of which define distinct activities required to classify an object 101 in the traffic detection zone 103, to generate one or more output signals 110 for use with traffic signal controllers 196, and to enable a tool 170 configured to manage system functions.

Referring to FIG. 2, the present invention is initialized by the step 120 of identifying and drawing a traffic detection zone 103. The traffic detection zone 103 may be initialized by a user via the traffic management tool 170, for example via an application resident on a computing device and/or using a graphical user interface. The user at step 120 may select a specific size and location of a traffic detection zone 103 in relation to a traffic intersection or other portion of a roadway, using the traffic management tool 170. The traffic detection zone 103 may therefore be pre-selected by a user prior to performance of the classification engine defined herein, and may also be adjusted by the user during system performance. Alternatively, the size, location, and number of traffic detection zones 103 may be automatically selected and adjusted.

The different outputs 104 for object types 102 are assigned at step 122, and the framework 100 then commences system operation and data collection at step 124. At step 126, the present invention analyzes and processes input data 130 from one or more sensors 132 and generates 128 one or more output signals 110 based on the object type 102.

Input data 130 is collected from the one or more sensors 132, which may be positioned in or near a roadway area for which the traffic detection zone 103 is identified and drawn. The one or more sensors 132 include video systems 133 such as cameras, thermal cameras, radar systems 134, magnetometers 135, acoustic sensors 136, and any other devices or systems 137 which are capable of detecting a presence of objects within a traffic environment.

Figure 3:
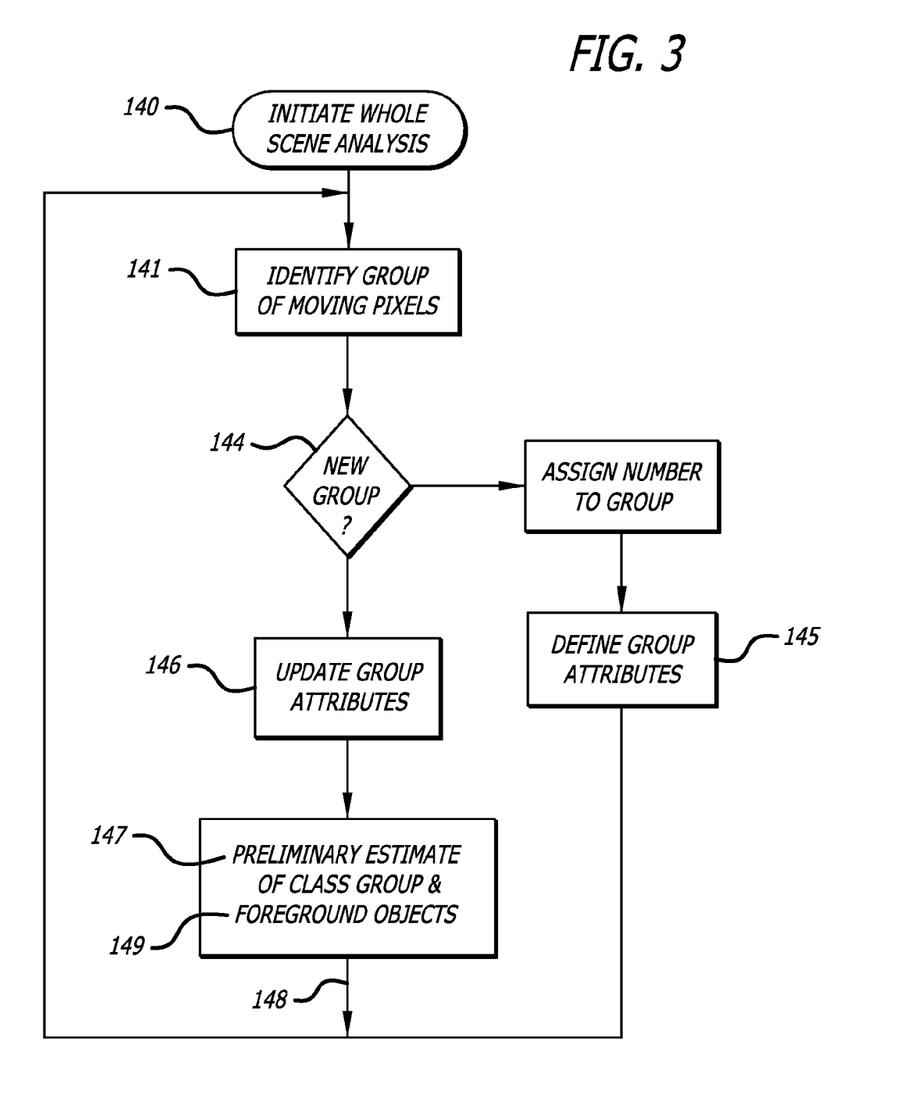
FIG. 3 is a flowchart of steps performed in a whole scene analysis according to one aspect of the present invention.

FIG. 3 is a flow diagram showing steps in a whole scene analysis 140, which may be performed, along with other elements of the present invention, within a computing environment 180 that is configured at least in part to execute one or more program instructions in a plurality of data processing modules 181 that includes a specific whole scene analysis module 183 for performing whole scene analysis 140. The computing environment 180 also includes one or more processors 189 and a plurality of software and hardware components as well as memory components for storing and recalling the one or more program instructions. The one or more processors 189 and plurality of software and hardware components are configured to perform the functions of the multi-object zonal traffic detection framework 100 described herein, and embodied in the one or more data processing modules 181. The whole scene analysis 140 and whole scene analysis module 183 process temporal information 138 in the input data 130 by examining a complete "field of view" in the data provided by the one or more sensors 132.

This whole scene analysis 140 associates data points, such as for example pixels, using common data point characteristics 143 and attempts to identify 141 one or more groups of moving data points 142. In one aspect of the whole scene analysis 140, if it is determined, at step 144, that an association of moving data points is a new group 142, a number is assigned to the group 142, and group attributes 145 are defined. If the group 142 is not new, group attributes 145 are updated at step 146, and a preliminary identification of a group class, or object type 102, is made at step 147. An output 148 from this whole scene analysis 140 is provided to a zone detection zone background learning module 184 and a classification module 186.

The whole scene analysis 140 analyzes the temporal information 138 by examining every data point in the sensor data to, as noted above, associate groups of moving data points 142 that have common data point characteristics 143 (not shown). The common characteristics 143 enable an initial identification of a group of moving data points 142 as a foreground object 149. The common characteristics 143 examined in this whole scene analysis 140 at least include a color, a luminance, a position, and movement of the data points to identify an object in motion. The whole scene analysis 140 tries to identify groups of moving data points 142 by looking for commonalties in these characteristics 143 to arrive at a conclusion that the object 101 is a foreground object 149.

Figure 4:
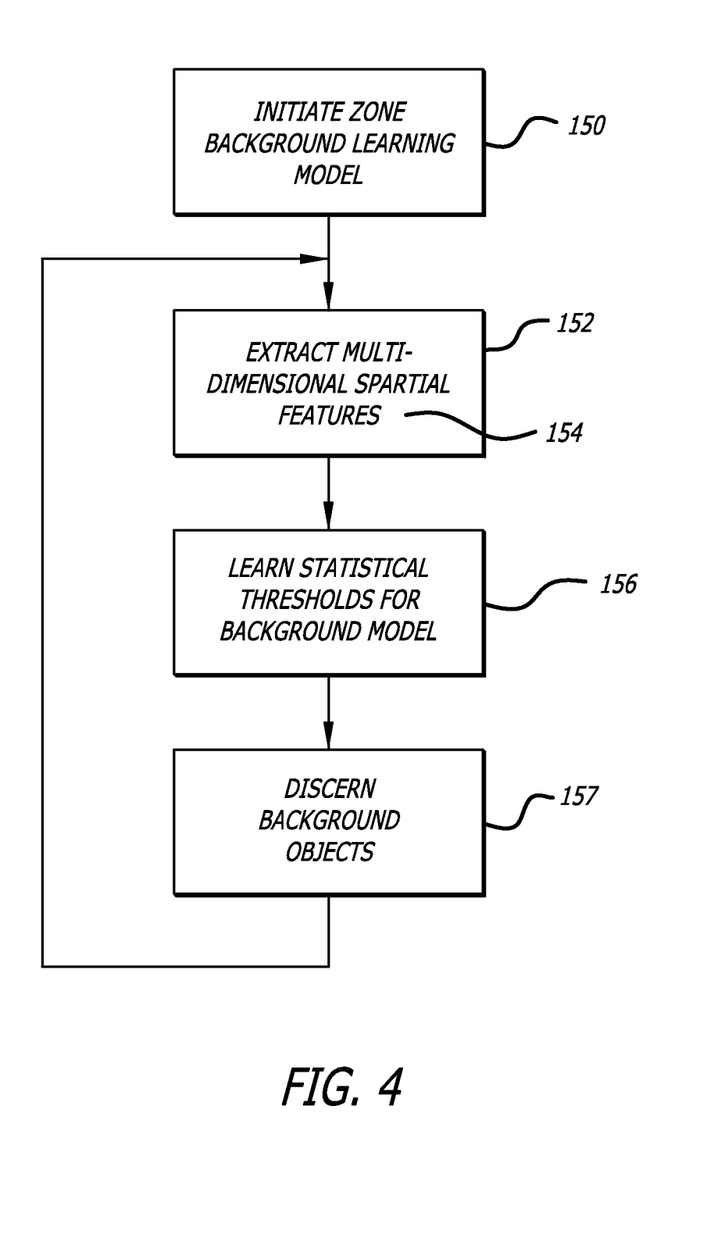
FIG. 4 is a flowchart of steps performed in a background detection and learning analysis according to one aspect of the present invention.

FIG. 4 is a flow diagram showing steps in a detection zone background learning model 150, which may be performed by a specific module 184 within the computing environment 180. The detection zone background learning model 150 and module 184 process spatial information 139 in the input data 130 and is initialized with information defining the traffic detection zone 103 and the input data 130.

The detection zone background learning model 150 examines specific data point attributes 151 within the identified traffic detection zone 103, and attempts to adaptively learn what is in the background 155 (not shown) over time. The classification engine applies this learned model 150 to differentiate all of or a portion of detection zone data points from known background objects 157.

At step 152, the model 150 extracts multi-dimensional spatial features 154, and then learns statistical thresholds for background characteristics 153 (not shown) at step 156. This results in an adaptive model of the background 155 of the identified traffic detection zone 103 that is continuously generated and adjusted as additional input data 130 is ingested into the multi-object zonal traffic detection framework 100. Through this process, the present invention continually learns what objects are part of the background 155 for subsequent differentiation in the classification module 186.

Background characteristics 153 include one or more of a roadway surface, roadway or lane markings, and roadway shadows within the identified traffic detection zone 103. These may include permanent and temporary characteristics as well as items which change over time at different rates. For example, other background characteristics 153 may include temporary items such as road markers or traffic cones which are placed for an extended or particular period of time within the identified traffic detection zone 103. Also, a roadway surface may include a surface texture, permanent markings or fixtures, tree shadows, and building shadows which may have only minimal or slow changes over a certain period of time. The detection zone background learning model 150 looks at specific multi-dimensional data point attributes 151 in the input data 130 collected by the one or more sensors 132 to identify background characteristics 153 and learn what may be part of the background 155. Examples of these multi-dimensional data point attributes 151 include a pixel histogram, directional edges, and a gray scale mean. Other examples include a motion analysis (optical flow), frame difference data, and corner features.

In one embodiment of the present invention, the detection zone background learning model 150 may also be configured to monitor data points over time to determine if they represent a part of the background. For example, if data points such as pixels are present for less than specified period of time, the algorithm determines that they represent a foreground object 149. If the pixels are present for greater than a specified period of time, the algorithm determines that they represent a part of the background 155. The traffic management tool 170 may include the capability to allow the user to set these specified periods of time.

Together, the whole scene analysis 140 and the detection zone background learning model 150 enable a preliminary distinction between foreground objects 149 and background objects 157. Using the whole scene analysis 140, the present invention tracks a moving object 101 and knows that the moving object 101 has entered the identified traffic detection zone 103. This helps the detection zone background learning model 150 to discern that changes in the background 155 of the identified traffic detection zone 103 are caused by the intrusion of the object 101, thus matching the background change to the actual moving object 101 and enabling a differentiation between foreground objects 149 and background objects 157.

Figure 5:
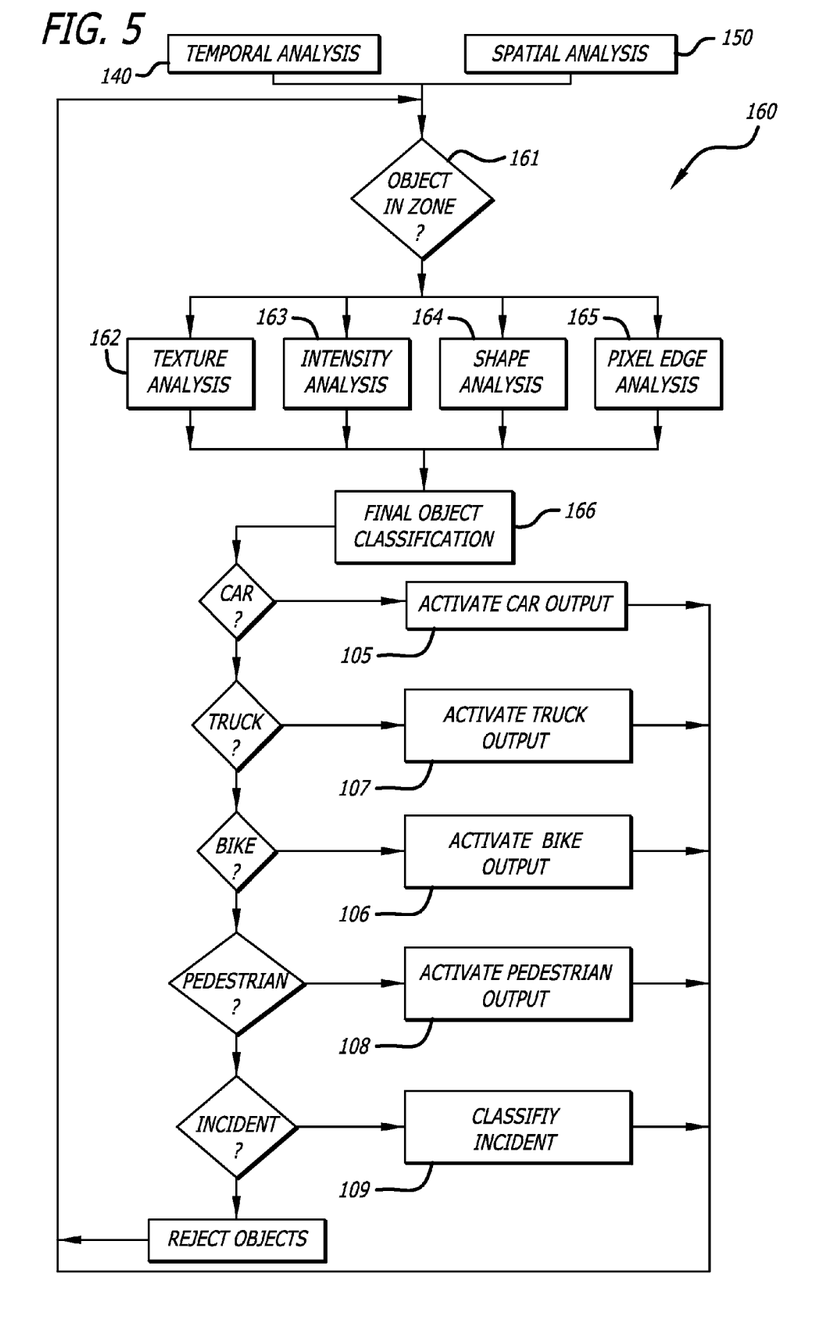
FIG. 5 is a flowchart of steps performed in an object classification analysis according to one aspect of the present invention.

The classification module 186 of the multi-object zonal traffic detection framework 100 performs the steps shown in FIG. 5 in a classification analysis 160. This module 186 is initialized with output from the temporal analysis of the whole scene analysis 140, and with output from the spatial analysis of the detection zone background learning model 150. The classification module 186 applies these outputs to classify the temporal information 138 and spatial information 139 by determining, at step 161, if a group of moving data points 142 in the foreground of the identified traffic detection zone 103 represent one or more foreground objects 149, and if so, identifying, at step 166, an object type 102 based on dominant object type features for each object type 102.

A group of moving data points 142 is determined to be a foreground object 149 by applying the preliminary identification of a foreground object 149 at step of 147 of the whole scene analysis 140 and what is in the known background 155 from the detection zone background learning model 150. If the foreground object 149 does not form a part of the known background 155, the classification analysis 160 proceeds with attempting to classify the foreground object 149 as one of several object types 102, including a motorized passenger vehicle or car, a larger commercial vehicle or truck, a two-wheeled vehicle such as a bicycle or a motorcycle, a pedestrian or group of pedestrians, and an incident.

Object type features are used to identify an object by applying several different analyses to data points in the temporal information 138 and the spatial information 139. In the case of pixels as data points, these include a pixel texture analysis 162, a pixel intensity analysis 163, a pixel shape analysis 164, and a pixel edge analysis 165. Different sub-modules may be utilized to perform these analyses. These different sub-modules analyze, respectively, pixel characteristics such as pixel texture content, pixel intensity, pixel shape, and pixel edges, as well as object attributes of groups of moving pixels 142 that include width, height, contour, centroid, and moments, and object tracking attributes of groups of moving pixels 142, such as speed, velocity, number of frames observed, number of frames missed, and object trajectory.

Continuing with the example of pixels as data points, once the analyses above are applied, the classification analysis 160 and classification module 186 proceed with applying specific dominant object type features that are known for each object type 102 and comparing with the pixel texture content, pixel intensity, pixel shape, pixel edges, object attributes, and object tracking attributes to assign an object type 102 to each group of moving pixels 142 that has been determined to be a foreground object 149.

It should be noted that the following classifications are exemplary classifications of objects 101, and may be changed or adjusted by a user of the present invention. Where the pixel/data point analysis in the classification module 186 indicates, for example, a medium height, low width, sparsely distributed pixel intensities, low number of edges, and low-to-medium speed, the object 101 may be classified as a bicycle 106, and an appropriate output 104 is generated for a traffic management system 194 and to the counting module 188. Where the pixel/data point analysis of the classification module 186 indicates, for example, a medium-to-large height, medium-to-large width, pixel intensities concentrated over a narrow range, medium-to-high number of edges, and medium-to-high speed, the object 101 may be classified as a motorized passenger vehicle or car 105, and an appropriate output 104 is generated for a traffic management system 194 and to the counting module 188.

Where the pixel/data point analysis in the classification module 186 indicates, for example, a large height, a large width, pixel intensities distributed over a few bands, high number of edges, and a medium speed, the object 101 may be classified as a truck or large commercial vehicle 107, and an appropriate output 104 is generated for a traffic management system 194 and to the counting module 188. It should be noted that such trucks can typically span more than one detection zone 103, and therefore the classification analysis 160 may combine features from one or more of neighboring traffic detection zones to make a final classification of an object 101 as a truck 107.

Where the pixel/data point analysis in the classification module 186 indicates, for example, a particular direction of the movement, speed of the movement, shape, certain body signature, and special body pose, the object 101 may be classified as a pedestrian 108, and an appropriate output 104 is generated for a traffic management system 194 and to the counting module 188. In the case of incidents 109, the present invention looks for pixel characteristics 143 and attributes 151 that can be segmented over a specified period of time, so that it is more likely indicative of debris in zone, stopped vehicles, wrong-way traffic etc. to generate an appropriate output 104 for a traffic management system 194 and the counting module 188.

The classification analysis 160 may also apply a statistical classifier 168 to further analyze multi-dimensional object attributes and differentiate objects 101 of multiple types 102. Such a statistical classifier 168 may be either a supervised classifier or an unsupervised classifier, or a combination of both. Examples of supervised classifiers include SVM, CNN/deep learning, etc., and examples of unsupervised classifiers include K-means clustering, expectation maximization, GMM, etc. Where a supervised classifier is incorporated into the classification analysis 160 in the present invention, the statistical classifier may be trained through many training samples (such as car samples, bicycle/motorcycle samples, pedestrian samples, truck samples and samples of different kinds of background. After the supervised classifier is trained, it is able to identify different objects 101 from newly input images as cars, bicycles, pedestrians, etc. based on what has been learned from the training.

Figure 6:
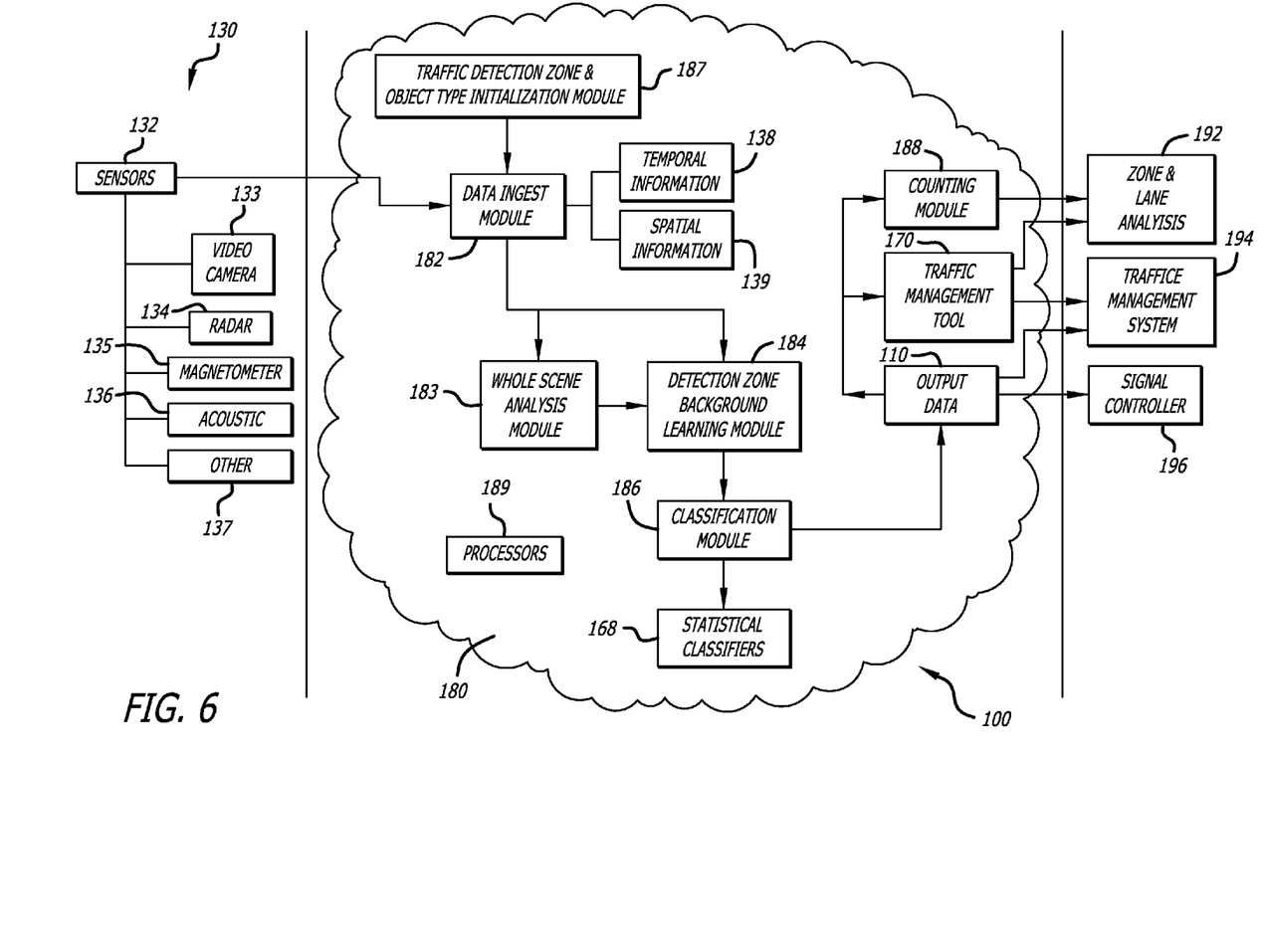
FIG. 6 is a system diagram for a multi-object zonal traffic detection framework and classification engine according to one aspect of the present invention.

FIG. 6 is a system diagram for a multi-object zonal traffic detection framework 100 of the present invention. Input data 130, comprised of information from the one or more sensors 132, is ingested via a data ingest module 182 for processing within a classification engine, comprised at least of the whole scene analysis 140, the zone detection background learning model 150, and the classification analysis 160.

The data ingest module 182 provides the input data 130 to the whole scene analysis module 183, which processes temporal information 138 from the input data 130 collected by the sensors 132 and performs the steps as in FIG. 3. The data ingest module 182 also provides the input data 130 to the detection zone background learning module 184, which processes spatial information 139 from the input data 130 collected by the sensors 132 and performs the steps as in FIG. 4.

The plurality of data processing modules 181 within the framework 100 may also include a traffic detection zone initialization module 187, which is responsible for drawing and identifying a traffic detection zone 103 as an initialization of the framework 100 in step 120 of FIG. 2. A user may manually identify and draw a traffic detection zone 103 using a traffic management tool 170, or a traffic detection zone 103 may be identified and drawn automatically. Regardless, information about the identified traffic detection zone 103 is provided to the data ingest module 182 for distribution to the classification engine for analyzing the temporal information 138 and the spatial information 139.

The multi-object zonal traffic detection framework 100 may also include a counting module 188, which performs and maintains a count 190 (not shown) of different object types 102. Object types 102 are assigned as in FIG. 2 by the initialization module 187, and outputs 104 representing different object types 102—car 105, bicycle 106, truck or other commercial vehicle 107, pedestrian 108, and incident 109—are provided to the counting module 188. The traffic detection zone 103 and framework 100 therefore generate a count 190 of each object type 102 detected by the classification engine. Using the geometry of all the traffic detection zones 103 that are drawn, the lane structure of a particular traffic approach can be estimated and individual zone counts can be aggregated into lane-wise counts of different object types 102. This output 104 is stored locally for later retrieval or transmission to a centralized traffic management system 194 for analysis and presentation using the traffic management tool 170.

The counting module 188 increments a count 190 for an object type 102 each time a particular object 101 leaves the identified traffic detection zone 103. This count 190 may be stored temporarily in local memory within the computing environment 180. The user may configure a 'Bin Interval' of one of a plurality of time bases. The framework 100 monitors this time base, and once a Bin Interval expires, the counts are stored in a database for later retrieval. Such a process is repeated continually.

Retrieval and viewing of the counts 190 may be performed by multiple methods. One such method is local viewing on using an on-screen display via a graphical user interface or the like. Counts 190 may also be remotely retrieved and viewing using the traffic management tool 170 directly, or using a computer-based platform or application, such as for example on a desktop, laptop, or tablet computing device or mobile telephony device. Counts 190 may also be accessed automatically through a remote system that interrogates nightly and downloads count data to a local database for viewing, creating of charts, graphs and reports.

The traffic management tool 170 supports both zone and lane analytics 192, and a traffic management system 194 for control of a traffic signal controller 196 using the output data 110. Zone and lane analytics 192 use output from the counting module 188. The traffic management support tool 170 may include widgets, drop-down menus, and other indicia presented via a graphical user interface that enable a user to make selections and perform functions attendant to operation of the multi-object zonal traffic detection framework 100.

The systems and methods of the present invention may be implemented in many different computing environments. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors or general processing units), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a mobile device or personal computer through such mediums as an applet, JAVA® or CGI script, as a resource residing on one or more servers or computer workstations, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method comprising:
ingesting input data that includes sensor data collected for an area of interest at a traffic intersection;
modeling the input data within a computing environment in a plurality of data processing modules executed in conjunction with at least one specifically-configured processor, the data processing modules configured to detect and classify multiple moving objects in the area of interest at the traffic intersection traffic detection zone, by
drawing a traffic detection zone comprised of different zones used by the multiple moving objects in the area of interest;
analyzing temporal information by examining pixels in the sensor data to associate groups of moving pixels having common pixel characteristics and initially identify a group of moving pixels as a foreground object in the different zones;
analyzing spatial information by extracting and examining specific multi-dimensional pixel attributes in the sensor data that include one or more of a pixel histogram, directional edges, and gray scale mean to identify background characteristics and estimate lane structures and other roadway markings within the traffic detection zone, to adaptively learn a background information model of the estimated lane structures and other roadway markings that identify zones for vehicular, cyclist, and pedestrian use among the different zones within the area of interest over time;
applying the background information model to determine if one or more of the pixels in the area of interest conform to the background characteristics and estimated lane structures and other roadway markings; and
classifying the temporal information and spatial information by determining if a group of moving pixels represent one or more foreground objects inside the zones for vehicular, cyclist, and pedestrian use, and identifying an object type of the one or more foreground objects based on dominant object type features that include one or more of pixel intensity, pixel edges, pixel texture content, pixel shape, object attributes, and object tracking attributes for each object type, wherein the object type is at least one of a bicycle, a truck, a passenger vehicle, a pedestrian, or an incident; and
generating, as output data, information representing the object type to a traffic controller system.

2. The method of claim 1, wherein the common pixel characteristics in the analyzing temporal information in the sensor data at least include color, luminance, position, and movement.

3. The method of claim 1, wherein the background characteristics include one or more of a roadway surface and roadway shadows within the identified traffic detection zone.

4. The method of claim 1, wherein the analyzing spatial information further comprises monitoring pixels over time to determine if they represent a part of the background, wherein if the pixels are present for less than specified period of time, they represent a foreground object, and if the pixels are present for greater than a specified period of time, they represent a part of the background.

5. The method of claim 1, wherein the object attributes include at least one of width, height, contour, centroid, and moments, and the object tracking attributes include at least one of speed, velocity, number of frames observed, number of frames missed, and object trajectory.

6. The method of claim 1, further comprising initiating a count of each object type present in the zones for vehicular, cyclist, and pedestrian use.

7. The method of claim 6, further comprising estimating a lane structure for the zones for vehicular, cyclist, and pedestrian use and initiating a count of each object type for each lane.

8. The method of claim 1, further comprising training a statistical classifier to further examine the specific multi-dimensional pixel attributes to classify the temporal and spatial information, so that different foreground objects are identified as additional input data is ingested.

9. The method of claim 1, wherein the sensor data is captured by at least one of a video camera, a radar system, and a magnetometer.

10. The method of claim 1, further comprising selecting a size and location of a traffic detection zone and the different zones used by the multiple moving objects in the area of interest using a traffic management tool.

11. A method of detecting multiple moving objects in a traffic intersection, comprising:
  drawing a traffic detection zone comprised of different zones within an area of interest at a traffic intersection;
  associating one or more pixels having common pixel characteristics in collected sensor data for the area of interest to initially identify a group of moving pixels in a temporal whole scene analysis of the different zones, the common pixel characteristics at least including pixel color, pixel luminance, pixel position, and pixel movement;
  developing a spatial background model to adaptively learn a background of estimated lane structures and other roadway markings that identify zones for vehicular, cyclist, and pedestrian use among the different zones within the area of interest over time in a zonal background analysis of the area of interest, by extracting and examining specific multi-dimensional pixel attributes in the sensor data to identify background characteristics and estimate the lane structures and other roadway markings defining the zones for vehicular, cyclist, and pedestrian use among the different zones within the traffic detection zone, and differentiate whether all or a portion of the pixels in the area of interest pixels conform to the background based on the identified background characteristics and estimated lane structures and other roadway markings;
  determining if a group of moving pixels represents a foreground object inside the zones for vehicular, cyclist, and pedestrian use among the different zones; and
  differentiating one or more foreground objects to identify an object type as either a bicycle, a passenger vehicle, a truck, a pedestrian, or an incident based on 1) evaluating a plurality of dominant object type features that include one or more of pixel intensity, pixel edges, pixel texture content, pixel shape, object attributes, and object tracking attributes, and 2) training a statistical classifier to further identify the object type from the dominant object type features in additional input data that is collected from one or more sensors.

12. The method of claim 11, further comprising generating an output representing the object type to a traffic controller system.

13. The method of claim 11, wherein the background characteristics include one or more of a roadway surface and roadway shadows within the identified traffic detection zone.

14. The method of claim 11, further comprising monitoring pixels over time to determine if they represent a part of the background, wherein if the pixels are present for less than specified period of time, they represent a foreground object, and if the pixels are present for greater than a specified period of time, they represent a part of the background.

15. The method of claim 11, wherein the object attributes include at least one of width, height, contour, centroid, and moments, and the object tracking attributes include at least one of speed, velocity, number of frames observed, number of frames missed, and object trajectory.

16. The method of claim 11, further comprising initiating a count of each object type present in the zones for vehicular, cyclist, and pedestrian use.

17. The method of claim 16, further comprising estimating a lane structure for the zones for vehicular, cyclist, and pedestrian use and initiating a count of each object type for each lane.

18. The method of claim 11, wherein the one or more sensors include least one of a video camera, a radar system, and a magnetometer.

19. The method of claim 11, further comprising selecting a size and location of a traffic detection zone and the different zones in the area of interest using a traffic management tool.

20. A system, comprising:
  a computing environment including at least one non-transitory computer-readable storage medium having program instructions stored therein and a computer processor operable to execute the program instructions within a plurality of data processing modules to detect multiple moving objects within an area of interest at a traffic intersection, the plurality of data processing modules including:
  a whole scene analysis module configured to draw a traffic detection zone comprised of different zones used by the multiple moving objects in the area of interest, and analyze temporal information in input data collected by one or more sensors for the area of interest by examining pixels inside the area of interest to associate groups of moving pixels having common pixel characteristics and initially identifying one or more groups of moving pixels as foreground objects in the different zones based on the common pixel characteristics;
  a detection zone background learning module configured to 1) analyze spatial information in the input data collected by one or more sensors for the area of interest by examining specific multi-dimensional pixel attributes inside the identified traffic detection zone, 2) identify background characteristics to adaptively learn a background information model of estimated lane structures and other roadway markings that identify zones for vehicular, cyclist, and pedestrian use among the different zones within the area of interest over time, and 3) apply the background information model to determine if one or more of the pixels in the area of interest conform to the background characteristics and estimated lane structures and other roadway markings;
  a classification module configured to classify the analyzed temporal information and the analyzed spatial information by 1) determining if a group of moving pixels represents one or more foreground objects inside the zones for vehicular, cyclist, and pedestrian use, and 2) identifying an object type of the one or more foreground objects based on dominant object type features that include one or more of pixel intensity, pixel edges, pixel texture content, pixel shape, object attributes, and object tracking attributes for each object type; and an output module configured to communicate the object type to a traffic controller system.

21. The system of claim 20, wherein the object type is at least one of a bicycle, a truck, a passenger vehicle, a pedestrian, or an incident.

22. The system of claim 20, wherein the common pixel characteristics in the analyzing temporal information in the sensor data at least include color, luminance, position, and movement.

23. The system of claim 20, wherein the background characteristics include one or more of a roadway surface and roadway shadows within the identified traffic detection zone.

24. The system of claim 20, wherein the detection zone background learning module is further configured to monitor pixels over time to determine if they represent a part of the background, wherein if the pixels are present for less than specified period of time, they represent a foreground object, and if the pixels are present for greater than a specified period of time, they represent a part of the background.

25. The system of claim 20, wherein the object attributes include at least one of width, height, contour, centroid, and moments, and the object tracking attributes include at least one of speed, velocity, number of frames observed, number of frames missed, and object trajectory.

26. The system of claim 20, further comprising an object counting module that initiates a count of each object type present in the zones for vehicular, cyclist, and pedestrian use.

27. The system of claim 26, wherein a lane structure within the zones for vehicular, cyclist, and pedestrian use is estimated, and the object counting module initiates a count of each object type for each lane.

28. The system of claim 20, wherein the classification module is further configured to classify the analyzed temporal information and the analyzed spatial information by training a statistical classifier to further identify the object type from the dominant object type features in additional input data that is collected from the one or more sensors.

29. The system of claim 20, wherein the one or more sensors include least one of a video camera, a radar system, and a magnetometer.

30. The system of claim 20, further comprising a traffic management tool configured to enable a user to identify a size and location of the traffic detection zone and the different zones used by the multiple moving objects in the area of interest.

* * * * *